July 16, 1940.  F. R. ELDER  2,208,182
ELECTRIC POWER TRANSMISSION SYSTEM
Filed Nov. 5, 1938
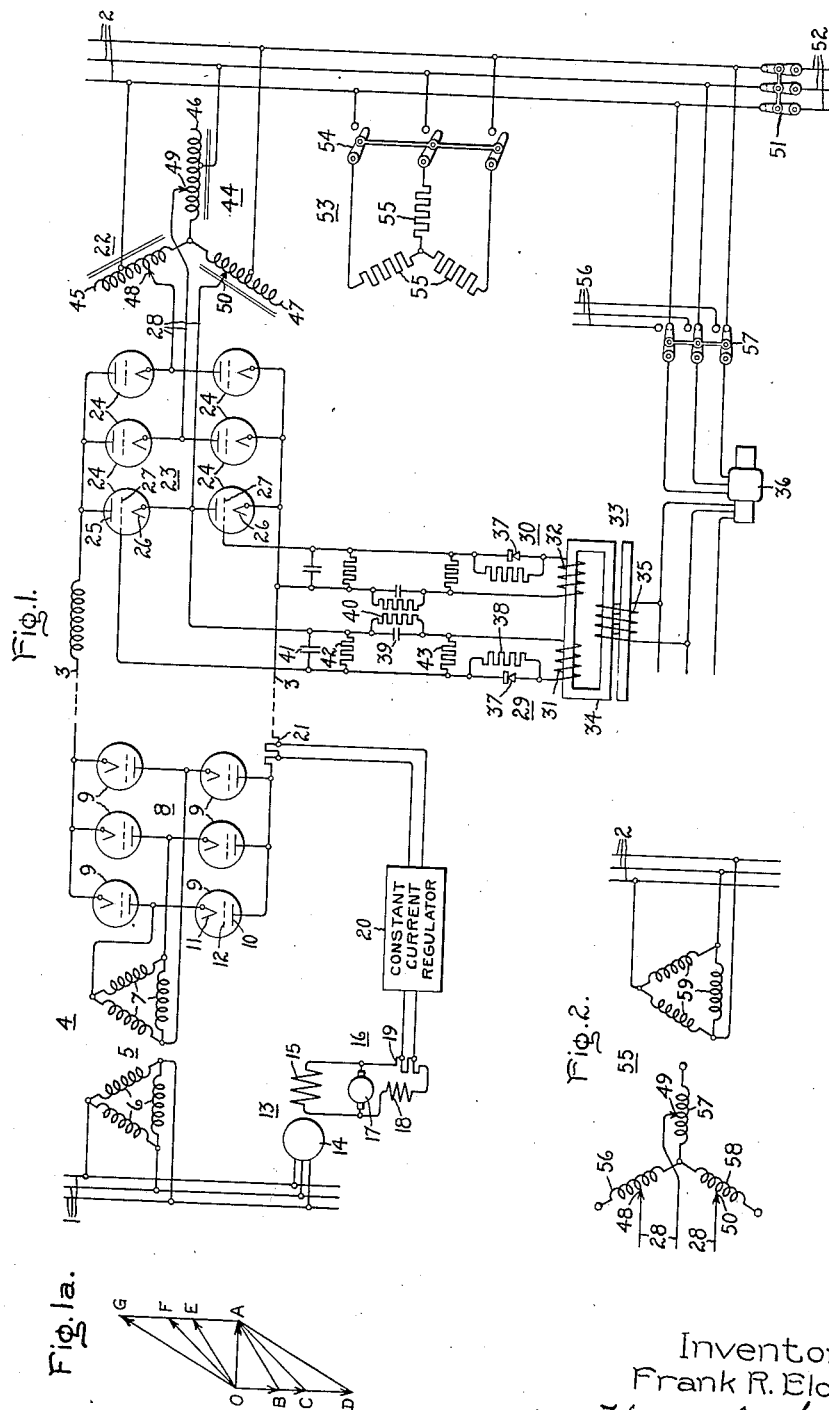
Inventor:
Frank R. Elder;
by Harry E. Dunham
His Attorney.

Patented July 16, 1940

2,208,182

UNITED STATES PATENT OFFICE 2,208,182

ELECTRIC POWER TRANSMISSION SYSTEM

Frank R. Elder, Schenectady, N. Y., assignor to General Electric Company, a corporation of New York Application November 5, 1938, Serial No. 239,061

17 Claims. (Cl. 175—363)

My invention relates to electric power transmission systems and more particularly to electric systems for transmitting power by means of high voltage direct current.

The transmission of electric power by means of high voltage direct current offers decided basic advantages over the alternating current systems. These advantages are well known and have been discussed in numerous engineering and technical publications and include simplicity in line equipment, economy in copper, relatively simple insulation conditions, reduced losses, lack of major inductive and capacitive reactance phenomena and the nonexistence of the stability problem. Heretofore, it has been proposed to use electric valves in high voltage systems for transmitting power by means of direct current. Electric valve apparatus offers distinct advantages in systems of this nature, some of which are ease of control, flexibility of control and the absence of rotary equipment.

The use of constant current direct current systems has been proposed heretofore for the transmission of electric power. Where systems of this nature are employed, it may be important to provide arrangements to permit connection to constant voltage alternating current circuits and which are susceptible of wide application and which are characterized by simplicity of construction and operation. In accordance with the teachings of my invention described hereinafter, I provide a new and improved system whereby electric power may be transmitted between direct current transmission circuits and constant voltage alternating current circuits.

It is an object of my invention to provide a new and improved electric power transmission system.

It is another object of my invention to provide a new and improved electric valve transmission system.

It is a further object of my invention to provide a new and improved electric system for transmitting power between a direct current circuit and an alternating current circuit.

It is a still further object of my invention to provide a new and improved electric transmission system for transmitting power between a constant current direct current circuit and a constant voltage alternating current circuit.

It is a still further object of my invention to provide a new and improved method of operating an electric power transmission system which transmits power between a direct current circuit and an alternating current circuit.

In accordance with the illustrated embodiments of my invention, I provide a new and improved electric power transmission system for transmitting power between direct current circuits and alternating current circuits, or for transmitting electric power between alternating current circuits through a system including a direct current link. More specifically, I provide an improved electric translating system for transmitting electric power between a constant current direct current circuit and a constant voltage alternating current circuit through electric valve apparatus and an associated inductive network which controls the voltage of the alternating current circuit. I provide suitable means, such as a properly controlled electric valve converter, for transforming direct current of constant value into alternating current of constant value. The electric valve means is of the type comprising a control member and preferably employs an ionizable medium such as a gas or a vapor. An inductive network is connected between the electric valve apparatus and the alternating current circuit and is arranged to control the voltage of the alternating current circuit. The output circuit of the electric valve apparatus is a constant current alternating current circuit and transmits a predetermined current to the inductive network. I also provide means, such as tap-changing apparatus, for controlling the ampere-turns of the inductive network to effect control of the voltage of the alternating current circuit. Where the alternating current circuit is connected to a relatively large system, adjustment or control of the tap-changing apparatus effects control of the amount of power transmitted between the constant current direct current circuit and the alternating current circuit. Where the alternating current circuit is not connected to an associated system or is not connected to generating apparatus, adjustment or control of the tap-changing apparatus also effects control of the voltage of the alternating current circuit. Adjustment of the tap-changing apparatus may not only control the voltage of the alternating current circuit but also effects control of the amount of power transmitted between the direct current circuit and the alternating current circuit.

For a better understanding of my invention, reference may be had to the following description taken in connection with the accompanying drawing and its scope will be pointed out in the appended claims. Fig. 1 of the accompanying drawing diagrammatically illustrates an embodiment of my invention as applied to an electric transmission system for transmitting power between two alternating current circuits through a system including a constant current direct current circuit. Fig. 1a represents certain operating characteristics of the arrangement of Fig. 1. Fig. 2 shows diagrammatically a modification of the arrangement shown in Fig. 1.

Referring now to Fig. 1 of the accompanying drawing, my invention is diagrammatically illustrated as applied to an electric transmission system for transmitting power between an alternating current circuit 1 and an alternating current circuit 2. The transmission system comprises a direct current circuit 3 which is of the constant current type. The circuit 3 may be an electrically long, high voltage direct current transmission line for transmitting power between alternating current systems or between an alternating current generating station and an alternating current distribution system.

For the purposes of illustrating my invention, I have chosen to represent my invention as applied to a system in which the direct current circuit 3 is energized from the alternating current circuit 1 through a transmitting station 4 which may comprise a transformer 5, having primary windings 6 and secondary windings 7, and an electric valve converter 8 which comprises a plurality of electric valve means 9. The electric valve means 9 are connected to effect full wave rectification of the alternating current obtained from circuit 1. The electric valve means 9 are preferably of the type employing an ionizable medium, such as a gas or a vapor, and each comprises an anode 10, a cathode 11 and may include a control member or grid 12 which may be connected to an associated grid circuit (not shown).

As a means for supplying direct current of constant value to the direct current circuit 3, I may employ any arrangement well known in the art and for the purposes of illustrating my invention, I have chosen to show an arrangement comprising a synchronous alternating current generator 13 having an armature winding 14 connected to the alternating current circuit 1 and having a field winding 15 which is variably energized in order to supply a constant current to the circuit 3. The field winding 15 of the synchronous generator 13 may be energized from any suitable arrangement, such as an exciter 16, having an armature winding 17 and a field winding 18. A suitable current controlling means, such as an adjustable resistance 19, may be connected in series relation with the field winding 18 to control the excitation of the exciter 16. In order to control the excitation of the exciter 16 and the excitation of the synchronous condenser 13 to maintain constant current in circuit 3, I employ any conventional constant current regulator 20 which is controlled in accordance with the current flowing in the direct current circuit 3. This control may be effected by utilizing the voltage drop appearing across a suitable shunt 21 which is associated with the circuit 3.

It is to be understood that I may employ other suitable arrangements well known in the art for supplying direct current of constant value to circuit 3. For example, I may employ arrangements such as that described and disclosed in United States Letters Patent 1,990,758 granted February 12, 1935, on an application of C. W. Stone and assigned to the assignee of the present application. The system described in the above mentioned Stone patent effects transformation of constant voltage alternating current into direct current of constant value.

I provide terminal apparatus 22 which effects transmission of power between the direct current circuit 3 and the alternating current circuit 2. As a means for transforming direct current of constant value into alternating current of constant value, I employ a suitable arrangement, such as an electric valve converter 23, which includes a plurality of electric valve means 24, which are preferably of the type employing an ionizable medium such as a gas or a vapor, and each of which includes an anode 25, a cathode 26, and a control member or grid 27. The electric valve converter 23, in the arrangement illustrated, operates as an inverter to transform the direct current of constant value into alternating current of constant value and supplies a constant current alternating current circuit 28 which is connected to the electric valve converter 23.

To energize properly the control members or grids 27 of the electric valve means 24 of the converter 23, I employ any suitable control circuit well known in the art. For the purposes of illustration, I have chosen to represent control circuits 29 and 30 as being of the type described and disclosed in United States Letters Patent No. 2,114,828 granted April 19, 1938, upon an application of B. D. Bedford and which is assigned to the assignee of the present application. Each of the control circuits 29 and 30 includes a source of alternating voltage of peaked wave form which may be furnished by secondary windings 31 and 32, respectively, of a transformer 33 which comprises a core structure 34 and a primary winding 35. The phase of the alternating voltage of peaked wave form induced in the secondary windings 31 and 32 may be controlled or adjusted by any suitable arrangement, such as a rotary phase shifter 36, which in turn may be energized from the alternating current circuit 2. Each of the control circuits 29 and 30 also includes a unidirectional conducting device, such as a contact rectifier 37, which permits the transfer of normal grid current. A suitable impedance element, such as a noninductive impedance 38, is connected across the associated contact rectifier 37 to provide a path for the flow of normal control member current in the event the contact rectifier 37 becomes inoperative. During normal operation when the rectifier 37 is functioning properly, it will be clear that the impedance to the flow of normal control member current is relatively small, whereas there is offered a relatively large impedance to the flow of the so-called "positive ion current." As a means for producing a suitable negative unidirectional biasing potential which is impressed on the grids 27, I employ a parallel connected capacitance 39 and a shunt connected resistance 40. A capacitance 41 is connected between the cathode 26 and the grids 27 to absorb extraneous transient voltages which may be present in the control circuits. An impedance 42 having a nonlinear impedance-current characteristic is connected across the capacitance 41, and a resistance 43 may also be connected in the circuit and this resistance may also be of the type having a nonlinear impedance-current characteristic. It is to be understood that all of the electric valve means in the converter 23 are energized from suitable control circuits for supplying the desired voltages which control the electric valves in order to supply to the alternating current circuit 28 a polyphase alternating current of constant value.

I provide an exclusively inductive network 44 which is connected between the constant current alternating current circuit 28 and the alternating current circuit 2. The inductive network 44 may comprise an auto-transformer including windings 45, 46, and 47 which are controlled to control the voltage of circuit 2 and to control the amount of power transmitted between the direct current circuit 3 and circuit 2, or to control the amount of power transmitted between the alternating current circuit 1 and the alternating current circuit 2. As a means for controlling the primary ampere-turns of the inductive network 44, or as a means for controlling the resultant magnetic field associated with the windings 45—47, I provide a suitable arrangement such as tap-changing devices 48, 49, and 50. Movement of the tap-changing devices 48—50 changes the number of the primary ampere-turns of the windings 45—47. For example, movement of the tap-changing devices 48—50 from the neutral of the windings 45—47 to a position to increase the number of turns supplied by the constant current alternating current circuit 28 increases the number of ampere-turns of these windings. Accordingly, the voltage appearing across the terminals of the windings 45—47 is increased and the voltage of the alternating current circuit 2 is correspondingly increased.

In order to initiate operation of the transmission system when the circuit 2 is not supplied by associated generating equipment or when the circuit 2 is not connected to an operating alternating current system, I provide switching apparatus 51 which permits isolation of the transmission system from an alternating current system 52. I provide an auxiliary circuit 53 which serves as a starting arrangement to raise the output voltage of the inductive network 44. The starting circuit 53 may comprise a switch 54 and a relatively high impedance auxiliary load, such as a plurality of resistances 55.

When the transmission system is connected to energize a circuit not including synchronous generating equipment, during the starting operation it is necessary to provide an auxiliary source of alternating current 56 for energizing the control circuits 29 and 30. A suitable switching device 57 may be employed to connect the rotary phase shifter 36 to the alternating current circuit 2 or to the auxiliary source 56.

The general principles of operation of the embodiment of my invention diagrammatically illustrated in Fig. 1 will be considered when the system is operating to transmit energy or power between the alternating current circuit 1 and the alternating current circuit 2. The electric valve converter 8 supplies direct current to the circuit 3, and the value of the direct current is maintained substantially constant by means of the regulator 20 which controls the excitation of the exciter 16. The exciter 16 in turn controls the excitation of the synchronous generator 13, which generates alternating current of constant avlue. Power may be transmitted to the terminal apparatus 22 by means of high voltage direct current of constant value over circuit 3.

The terminal apparatus 22 transforms direct current of constant value into constant voltage alternating current. The electric valve converter 23 operates as an inverter, transforming the direct current of constant value into alternating current of constant value and energizes circuit 28 accordingly. The network 44 permits control of the amount of power transmitted between the direct current circuit 3 and the alternating current circuit 2 and also permits control of the voltage of circuit 2 where the associated system connected to circuit 2 is not exceedingly "stiff." Adjustment of the tap-changing devices 48—50 controls the voltage of circuit 2 and also controls the amount of power transmitted to circuit 2.

Referring more particularly to the operation of the inductive network 44, it is to be noted that at all times the alternating current of circuit 28 is maintained at a substantially constant value, irrespective of the positioning of the tap-changing devices 48—50. As the tap-changing devices 48—50 are moved to increase the number of primary turns, the number of primary ampere-turns also increases correspondingly due to the fact that the current is maintained constant. Consequently, the resultant ampere-turns associated with the core structure of the inductive network 44 is increased correspondingly, effecting an increase in the terminal voltage of the inductive network 44, or, in other words, effecting an increase in the voltage of circuit 2. It is to be understood that the resultant or vector sum of the primary ampere-turns and the secondary ampere-turns determines the amount of flux linking windings 45—47 and hence determines the terminal voltage or output voltage of the inductive network 44. Therefore, the terminal voltage or output voltage of the inductive network 44 may be increased by increasing the number of turns associated with circuit 28, and conversely the output or terminal voltage of network 44 may be decreased by decreasing the number of turns associated with the constant current circuit 28.

Another feature of my invention relates to the manner in which the above described system permits transmission of power at constant voltage between the constant current direct current circuit 3 and the alternating current circuit 2. If it be assumed that the tap-changing devices 48—50 are adjusted to maintain a predetermined voltage of circuit 2 for a predetermined amount of power transfer, the tap-changing devices 48—50 must be adjusted in accordance with or in response to load transmitted. For example, if the amount of power consumed by the circuit 2 increases, the secondary ampere-turns of the network 44 increases correspondingly, tending to effect a reduction in the resultant ampere-turns and the magnetic field associated with windings 45—47. It is therefore necessary, in order to maintain the output or terminal voltage constant, to increase the number of primary ampere-turns in order that the resultant ampere-turns remain substantially constant. This may be effected by adjusting the tap-changing devices 48—50 to effect an increase in the primary ampere-turns. It is to be understood that the above discussion in connection with the operation of the inductive network 44 has been based on general or fundamental principles and has neglected certain refinements such as those which it may be desirable to consider to compensate for the leakage reactance of inductive network 44 and the voltage drops of windings 45—47. Conversely, if the load transmitted decreases after an initial adjustment of the tap-changing devices 48—50, the output voltage of the inductive network 44 tends to increase. If it is desired to maintain the voltage constant, the primary ampere-turns of the inductive network 44 should be decreased and that may be effected by reducing the number of turns of the windings 45—47 which are energized by the constant current circuit 28.

Another way in which the operation of the inductive network may be explained during the operation for effecting transfer of power at substantially constant voltage is that the tap-changing devices 48—50 must be positioned to maintain at a substantially constant value the resultant magnetic field associated with the windings 45—47. This control of the resultant magnetic field is effected by controlling the primary ampere-turns.

The manner in which the transformer 44 and the associated tap-changing apparatus operate to transform alternating current of constant value into constant voltage alternating current may be more fully explained by considering the operating characteristics shown in Fig. 1a. Since it is desired to supply power at constant voltage to circuit 2, the magnetic field of transformer 44 must be maintained at a substantially constant value. Because the primary ampere-turns must exceed the secondary ampere-turns by that amount required to establish and maintain the flux in the core member and since the secondary ampere-turns vary under varying power demands, the primary ampere-turns must also be changed with power delivered. Inasmuch as the primary current remains constant, it is necessary to vary the number of primary turns under changing load conditions. Vector OA of Fig. 1a may represent the resultant flux in the core member of transformer 44, or it may represent the resultant ampere-turns which are required to maintain the flux. Vectors OB, OC and OD represent the secondary ampere-turns for three different values of power transfer, and vectors OE, OF and OG represent the corresponding primary ampere-turns required to maintain the vector OA at the desired constant value. Because the primary current remains constant, the scalar values of vectors OE, OF and OG also represent the number of primary turns which must be operatively connected to maintain the output voltage of transformer 44 at a substantially constant value.

When the transmission system is operating to supply energy to the circuit 2 where the circuit 2 is connected to a synchronous system through switch 51, the transmission system may be brought into operation by moving the tap-changing devices 48—50 to the neutral position and increasing the number of ampere-turns associated with the circuit 28 until the system is transmitting the desired amount of power. It will be understood that when the tap-changing devices 48—50 are moved to the neutral position, the output voltage of the network 44 is zero. However, the current of circuit 28 is still maintained at the predetermined constant value by virtue of the fact that the circuit 3 is designed to transmit only a definite current.

When it is desired to place the system in operation for energizing another associated system not having synchronous generating equipment, the switch 51 is placed in the open circuit position and the switch 54 is closed, connecting the auxiliary circuit 53 to the inductive network 44. Tap-changing devices 48—50 are adjusted so that the output voltage of the network 44 is relatively small and the tap-changing devices are gradually adjusted to increase the terminal voltage to the desired value. When the voltage of the network 44 is so adjusted, switch 51 may be closed to energize associated circuit 52 and the auxiliary starting circuit 53 may be disconnected by opening switch 54. Under these starting conditions, due to the fact that the voltage of circuit 2 is zero, switch 57 is moved to the position in which the rotary phase shifter 36 is energized from the auxiliary source of alternating current 56. After the system has been initiated in its operation, the switch 57 may be moved to energize rotary phase shifter 36 from the alternating current circuit 2.

Fig. 2 diagrammatically illustrates a modification of the arrangement shown in Fig. 1. Instead of employing an auto-transformer, the network comprises a transformer 55 having primary windings 56, 57 and 58 and secondary windings 59. The tap-changing devices 48—50 are associated with windings 56—58 respectively, and operate to control the voltage of secondary windings 59.

The general principles of operation outlined above in connection with Fig. 1 also relate to the modification of the system shown in Fig. 2.

While I have shown and described my invention as applied to a particular system of connections and as embodying various devices diagrammatically shown, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, a constant current direct current circuit, an alternating current circuit, and apparatus connected between said direct current circuit and said alternating current circuit for controlling the voltage of said alternating current circuit and comprising electric valve means connected to said direct current circuit for transforming constant current direct current into constant current alternating current, a network exclusively inductive connected between said electric valve means and said alternating current circuit and means for controlling said network to transform alternating current of constant current into alternating current of a predetermined voltage.

2. In combination, a direct current circuit, a constant voltage alternating current circuit, means connected to said direct current circuit for transforming direct current into constant current alternating current, and apparatus for maintaining the voltage of said alternating current constant comprising an exclusively inductive transforming means connected between said last mentioned means and said constant voltage circuit and means for controlling said transforming means to change constant current alternating current into constant voltage alternating current.

3. In combination, a direct current circuit, a constant voltage alternating current circuit, means connected to said direct current circuit for transforming direct current into constant current alternating current, a constant current alternating current circuit connected to said last mentioned means, and apparatus connected between said constant current alternating current circuit and said constant voltage alternating current circuit and comprising a network exclusively inductive and means to control said network to transform constant current alternating current into constant voltage alternating current.

4. In combination, a constant current direct current circuit, an alternating current circuit, means connected to said direct current circuit for transforming direct current into constant current alternating current, a constant current alternating current circuit connected to said last mentioned means, a network exclusively inductive comprising a winding connected to said constant current alternating current circuit, and means for controlling the ampere-turns of said winding to control the voltage of said first mentioned alternating current circuit.

5. In combination, a constant current direct current circuit, an alternating current circuit, means connected to said direct current circuit for transforming direct current into constant current alternating current, a constant current alternating current circuit connected to said last mentioned means, a transformer having one winding connected to said constant current alternating current circuit and a second winding connected to said first mentioned alternating current circuit, and means for controlling the ampere-turns of said one winding to control the voltage of said first mentioned alternating current circuit.

6. In combination, a constant current direct current circuit, an alternating current circuit, means connected to said direct current circuit for transforming direct current into constant current alternating current, an exclusively inductive winding connected between said last mentioned means and said alternating current circuit, and means for maintaining the magnetic field linking said winding at a substantially constant value in order to effect transfer of power from said direct current to said alternating current circuit at a substantially constant voltage.

7. In combination, a constant current direct current circuit, an alternating current circuit, means connected to said direct current circuit for transforming direct current into constant current alternating current, a winding exclusively inductive connected between said last mentioned means and said alternating current circuit, and means for controlling said winding to maintain the resultant of the primary ampere-turns and the secondary ampere-turns at a substantially constant value in order to effect transfer of power from said direct current circuit to said alternating current circuit at a substantially constant voltage.

8. In combination, a constant current direct current circuit, a constant voltage alternating current circuit, electric valve means connected to said direct current circuit for transforming direct current into constant current alternating current, and means connected between said electric valve means and said constant voltage circuit and comprising an inductive network having taps and associated tap-changing apparatus for transforming constant current alternating current into constant voltage alternating current.

9. In combination, a constant current direct current circuit, a constant voltage alternating current circuit, means connected to said direct current circuit for transforming constant current direct current into constant current alternating current, and means connected between said last mentioned means and said constant voltage alternating current circuit for transforming constant current alternating current into constant voltage alternating current and comprising an inductive network having taps and tap-changing apparatus associated with said inductive network for controlling the power transmitted between said constant current direct current circuit and said constant voltage alternating current circuit.

10. In combination, a constant current direct current circuit, an alternating current circuit, electric valve means connected to said direct current circuit for transforming constant current direct current into constant current alternating current, a constant current alternating current circuit connected to said last mentioned means, exclusively inductive transforming means comprising a winding connected between said constant current alternating current circuit and said first mentioned alternating current circuit, and means for controlling said winding to transmit variable amounts of power to said first mentioned alternating current circuit at a substantially constant voltage.

11. In combination, a constant current direct current circuit, a constant voltage alternating current circuit, means connected to said direct current circuit for transforming direct current into constant current alternating current, a constant current alternating current circuit connected to said last mentioned means, exclusively inductive transforming apparatus connected between said constant current alternating current circuit and said constant voltage alternating current circuit including a plurality of windings, and means associated with said windings for controlling the voltage of said constant current alternating current circuit to control the power transfer between said direct current circuit and said constant voltage alternating current circuit.

12. In combination, a constant current direct current circuit, an alternating current circuit, means connected to said direct current circuit for transforming direct current into constant current alternating current, a constant current alternating current circuit connected to said last mentioned means, and means connected between said constant current alternating current circuit and said first mentioned alternating current circuit for controlling the voltage thereof and comprising a winding having associated tap-changing apparatus.

13. In combination, a constant current direct current circuit, a constant voltage alternating current circuit, electric valve converting apparatus connected to said direct current circuit for transforming direct current into constant current alternating current, said electric valve converting apparatus being provided with a control member to control the conductivity thereof, a constant current alternating current circuit connected to said electric valve converting apparatus, a plurality of windings connected between said constant current alternating current circuit and said constant voltage alternating current circuit, and means for varying the number of turns of said windings effectively connected in power transmitting relationship.

14. In an electric power transmission system for transmitting power between a constant current direct current circuit and a constant voltage alternating current circuit through serially-connected electric valve means and a network exclusively inductive, the method of controlling the voltage of said alternating current circuit which comprises controlling the resultant ampere-turns of said network.

15. In an electric power transmission system for transmitting energy between a constant current direct current circuit and a constant voltage alternating current circuit through serially-connected electric valve means and a network exclusively inductive, the method of controlling the power flow between said first mentioned circuits which comprises controlling the resultant ampere-turns of said inductive network.

16. In combination, a constant current direct current circuit, an alternating current circuit, means for transforming constant current direct current into constant current alternating current, an inductive network connected to said last mentioned means for transforming constant current alternating current into alternating current of a predetermined voltage, and means for initiating transfer of power between said direct current circuit and said alternating current circuit and comprising an auxiliary circuit for initiating the buildup of voltage of said alternating current circuit during a starting operation and means for selectively connecting and disconnecting said auxiliary circuit from said alternating current circuit.

17. In combination, a constant current direct current circuit, an alternating current circuit, electric valve means for transforming constant current direct current into constant current alternating current, an inductive network connected between said electric valve means and said alternating current circuit for transforming constant current alternating current into alternating current of constant voltage, means for initiating the transfer of power between said direct current circuit and said alternating current circuit and comprising an auxiliary circuit, and means for connecting said auxiliary circuit to or disconnecting said auxiliary circuit from said inductive network.

FRANK R. ELDER.